United States Patent
Hsiao et al.

(10) Patent No.: US 9,389,360 B2
(45) Date of Patent: Jul. 12, 2016

(54) BACKLIGHT MODULE AND LIQUID CRYSTAL DISPLAY COMPRISING THE SAME

(71) Applicant: SHENZHEN CHINA STAR OPTOELECTRONICS TECHNOLOGY CO., LTD., Shenzhen, Guangdong (CN)

(72) Inventors: Yu Chun Hsiao, Shenzhen (CN); Shih Hsiang Chen, Shenzhen (CN); Gege Zhou, Shenzhen (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 14/241,397

(22) PCT Filed: Jan. 21, 2014

(86) PCT No.: PCT/CN2014/070981
§ 371 (c)(1),
(2) Date: Feb. 26, 2014

(87) PCT Pub. No.: WO2015/007080
PCT Pub. Date: Jan. 22, 2015

(65) Prior Publication Data
US 2015/0253496 A1 Sep. 10, 2015

(30) Foreign Application Priority Data
Jul. 19, 2013 (CN) .......................... 2013 1 0307447

(51) Int. Cl.
*F21V 8/00* (2006.01)
*G02F 1/1333* (2006.01)

(52) U.S. Cl.
CPC ............ *G02B 6/0091* (2013.01); *G02B 6/0085* (2013.01); *G02F 2001/133317* (2013.01)

(58) Field of Classification Search
CPC ................................ G02B 6/0085; G02B 6/91
See application file for complete search history.

(56) References Cited

U.S. PATENT DOCUMENTS

| 2012/0236541 A1 | 9/2012 | Chen | 362/97.2 |
| 2013/0128613 A1* | 5/2013 | Tang | 362/609 |

FOREIGN PATENT DOCUMENTS

| CN | 102155691 A | 8/2011 |
| CN | 202067045 U | 12/2011 |

(Continued)

OTHER PUBLICATIONS

Chinese Search Report dated Dec. 26, 2014, issued to the corresponding Chinese Application No. 2013103074479.

(Continued)

*Primary Examiner* — Thomas M Sember
(74) *Attorney, Agent, or Firm* — Stein IP, LLC

(57) ABSTRACT

The present disclosure relates to a backlight module and a liquid crystal display comprising the same. The backlight module comprises a light guide plate, a glue frame, a bent heat dissipating plate, a locating block matching with the heat dissipating plate to fix the glue frame, and a light source lamp arranged on the sidewall at the light-incoming side of the light guide plate of the heat dissipating plate, which faces the light guide plate. The locating block is of a groove-shaped structure comprising a first wall and a second wall. In the assembly process, the locating block is arranged on the top of the sidewall of the heat dissipating plate, on which the light source lamp is provided. The first wall joints the glue frame, and the second wall abuts against the light guide plate. The backlight module according to the present disclosure is able to narrow the frame of the liquid crystal display without leading to other problems.

6 Claims, 1 Drawing Sheet

(56) References Cited

FOREIGN PATENT DOCUMENTS

| CN | 102661550 A | 9/2012 |
| CN | 202720414 U | 2/2013 |
| CN | 103196082 A | 7/2013 |
| CN | 103398325 A | 11/2013 |
| TW | M437472 U1 | 9/2012 |

OTHER PUBLICATIONS

International Search Report dated May 6, 2014, issued to International Application No. PCT/CN2014/070981.

* cited by examiner

BACKLIGHT MODULE AND LIQUID CRYSTAL DISPLAY COMPRISING THE SAME

TECHNICAL FIELD

The present disclosure relates to a liquid crystal device, in particular to a backlight module and a liquid crystal display including the backlight module.

BACKGROUND

Thin film transistor liquid crystal display (namely TFT-LCD) is one of the major types of flat panel displays at present, and is widely used in electronic equipment. A backlight module of TFT-LCD mainly comprises s a back plate, a light guide plate, a light bar, a heat dissipating plate, an optical diaphragm, a glue frame, a front frame, and the like.

Currently, the frame of a liquid crystal display tends to be narrower and narrower, which requires that of the backlight module to be narrower. Thus, in order to narrow the frame, the back plate can be removed. However, in this case the mechanical strength of the whole backlight module might be greatly weakened, which would easily lead to other problems. Another option is to narrow the glue frame, which, however, can only narrow the frame of the liquid crystal display to a lesser extent. In addition, a narrower frame can be realized by providing a thinner side wall of the heat dissipating plate, but this would negatively influence the heat dissipating effect of the liquid crystal display. Therefore, a method of greatly narrowing the frame without leading to other problems to the liquid crystal display is needed.

SUMMARY OF THE INVENTION

To solve the above technical problems in the prior art, the present disclosure proposes a backlight module which can greatly narrow the frame of a liquid crystal display without leading to other problems to the liquid crystal display. The present disclosure further relates to a liquid crystal display using the backlight module.

(1) According to a first aspect of the present disclosure, there is provided a backlight module, comprising a light guide plate, a glue frame, a bent heat dissipating plate, and a locating block in cooperation with the heat dissipating plate to fix the glue frame, a light source lamp facing the light guide plate being arranged on the sidewall of the heat dissipating plate at the light-incoming side of the light guide plate. The locating block forms a groove-shaped structure comprising a first wall and a second wall. When being assembled, the locating block is arranged on the top of the sidewall of the heat dissipating plate, on which the light source lamp is provided, and the first wall engages with the glue frame, and the second wall abuts against the light guide plate.

In the backlight module according to the present disclosure, the light source lamp is directly arranged on the heat dissipating plate, thus saving components for mounting the light source lamp. Consequently, the objectives of greatly narrowing the frame of the liquid crystal display and greatly improving the heat dissipating performance of the backlight module are satisfied.

(2) In embodiment (1) of the present disclosure, an inserting port is formed on the glue frame, and the first wall can insert into the inserting port to position the glue frame. The connection between the locating block and the glue frame can not only position the glue frame, but also avoid changes to the main body structure of the heat dissipating plate, so that circuits on the heat dissipating plate need not to be redesigned or rearranged, and they would not be damaged, either, thereby facilitating the production. In addition, the simple connection of the locating block and the heat dissipating plate simplifies the assembly also.

(3) In one of the embodiments of (1) or (2) of the present disclosure, the thickness of the second wall is greater than that of the light source lamp. In this case, a certain gap exists between the light guide plate and the light source lamp, thus preventing the light guide plate from crashing the light source lamp. In addition, the light guide plate may also directly abut against the bent plate so as to be positioned, thus ensuring the coupled light distance. In a preferred example, two locating blocks arranged at interval are provided. The light source lamp is arranged in an area between the locating blocks. In this case, light emitted by the light source lamp will not be shielded by the second wall of the locating block, thus the brightness of the backlight module is improved.

(4) In any one of the embodiments (1) to (3) of the present disclosure, the locating block further comprises a third wall extending towards the light guide plate, when being assembled, the third wall is located between the light guide plate and the bottom plate of the heat dissipating plate. In a preferred example, a fixing hole is formed on the third wall to fixedly connect the third wall with the heat dissipating plate.

(5) In any one of embodiments (1) to (4) of the present disclosure, when being assembled, the bottom plate of the heat dissipating plate is located below the light guide plate, and projections in contact with the light guide plate are arranged on the bottom plate of the heat dissipating plate. Thanks to this structure, good heat dissipating performance of the backlight module can be ensured, and the mechanical strength of the backlight module can also be improved.

(6) According to a second aspect of the present disclosure, a liquid crystal display using the above backlight module is proposed. In a specific example, the liquid crystal display also includes a panel and an outer frame for assembling the backlight module and the panel together.

In the present application, the term "the inner side of the sidewall of the heat dissipating plate" refers to the face of the sidewall of the heat dissipating plate facing the lateral surface of the light guide plate, and the term "below the light guide plate" indicates a direction away from the light guide plate and the external environment.

Compared with the prior art, the present disclosure has the advantages that the light source lamp can be directly arranged on the heat dissipating plate, thus saving components for mounting the light source lamp. Therefore, the objective of greatly narrowing the frame of the liquid crystal display can be achieved, and the heat dissipating performance of the backlight module can also be greatly improved. By arranging locating blocks on the sidewall of the heat dissipating plate, the effects of positioning the glue frame and protecting the light source lamp can be realized at the same time. Moreover, the locating block rides on the sidewall of the heat dissipating plate, thus avoiding the need to change the main body structure of the heat dissipating plate. Therefore, circuits on the heat dissipating plate need not to be redesigned and rearranged, and they would not be damaged either, thus facilitating the production of the liquid crystal display.

BRIEF DESCRIPTION OF THE DRAWINGS

The present disclosure will be described in more detail below based on the embodiments with reference to the accompanying drawings, in which.

In the accompanying drawings, the same components are indicated by the same reference signs. The accompanying drawings are not drawn to actual scale.

DETAILED DESCRIPTION OF THE EMBODIMENTS

The present disclosure will be further illustrated below in conjunction with the accompanying drawings.

Figure 1:
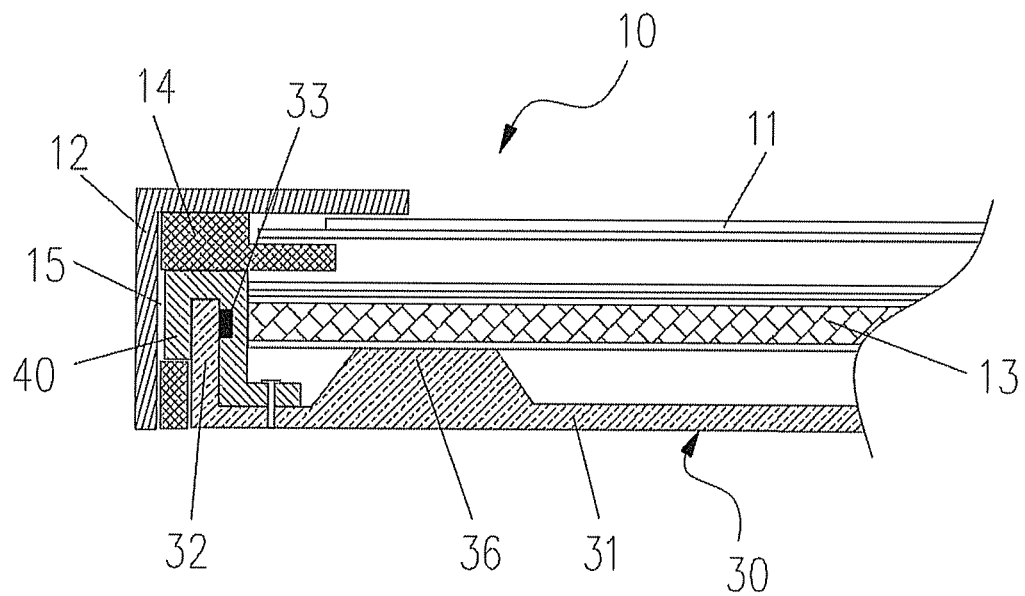
FIG. 1 is a cross section diagram of a liquid crystal display according to the present disclosure.

FIG. 1 schematically shows a cross section diagram of a liquid crystal display 10 according to the present disclosure. The liquid crystal display 10 mainly comprises a panel 11, a backlight module, and an outer frame 12 for assembling the panel 11 and the backlight module together. It shall be understood that the liquid crystal display 10 further comprises other components, which, along with their assembly structures, are known to those skilled in the art. For the sake of conciseness, they will not be described here.

Referring to FIG. 1, the backlight module comprises a light guide plate 13, a glue frame 14, a heat dissipating plate 30, and a locating block 40 in cooperation with the outer frame 12. The heat dissipating plate 30 is bent, namely provided with a base plate 31 and a side wall 32 which is substantially vertical to the base plate 31. When being assembled, the base plate 31 is located below the light guide plate 13, and the side wall 32 is located at the light-incoming side of the light guide plate 13. A light source lamp 33 is arranged on the side wall 32 of the heat dissipating plate 30, so that light can be emitted to the light guide plate 13 to illuminate the liquid crystal screen. The light source lamp 33 being directly arranged on the heat dissipating plate 30 not only improves the heat dissipating performance of the backlight module, but also saves components (not shown) for mounting the light source lamp 33. In this case, the objective of greatly narrowing the frame of the liquid crystal display 10 can be achieved. It should be noted that FIG. 1 merely schematically shows the mounting position of the light source lamp 33 relative to the light guide plate 13, and it does not necessarily overlap with the position of the connecting bolt 40.

Projections 36 are arranged on the base plate 31 of the heat dissipating plate 30. When being assembled, the projections 36 will contact with the light guide plate 13, thereby improving the heat dissipating performance of the backlight module. Moreover, the heat dissipating plate 30 with such a structure can also support the light guide plate 13, thereby improving the mechanical property of the backlight module.

Figure 2:
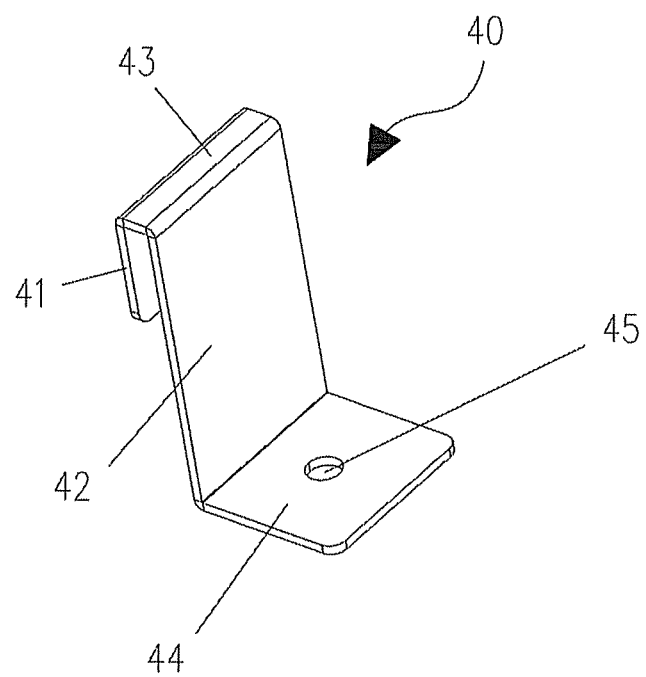
FIG. 2 is a three-dimensional schematic diagram of a location block according to the present disclosure.

FIG. 2 is a three-dimensional view schematically showing the locating block 40 according to the present disclosure. The locating block 40 comprises a first wall 41, a second wall 42, and a top plate 43 for connecting the top end of the first wall 41 and the top end of the second wall 42 together. The locating block 40 forms a groove shape as a whole. In addition, the locating block 40 further comprises a third wall 44, which is connected with the bottom end of the second wall 42 and extends away from the first wall 41. A gap between the first wall 41 and the second wall 42 matches the thickness of the sidewall 32 of the heat dissipating plate 30. Moreover, an angle between the second wall 42 and the third wall 44 is approximately equal to that between the sidewall 32 and the bottom plate 31 of the heat dissipating plate 30, so as to conveniently assemble the locating block 40 with the heat dissipating plate 30 together. In addition, the first wall 41 is sized relatively small, so as to position the glue frame 14. The positioning structure thereof will be described below.

As shown in FIG. 1, when being assembled, the locating block 40 rides across the top of the sidewall 32 of the heat dissipating plate 30, the first wall 41 engages with the glue frame 14, the second wall 42 abuts against the light guide plate 13, and the third wall 44 is located between the light guide plate 13 and the bottom plate 31 of the heat dissipating plate 30. Specifically, an inserting port 15 into which the first wall 41 can insert is formed on the glue frame 14, so as to position the glue frame 14. Under the condition that the mechanical structure is ensured, the thickness of the first wall 41 can be relatively small, so as to further narrow the outer frame 12.

The thickness of the second wall 42 is preferably greater than that of the light source lamp 33. When being assembled, the light guide plate 13 will abut against the second wall 42 of the locating block 40, but not touch the light source lamp 33. Therefore, the light source lamp 33 would not be damaged. In addition, the light guide plate 13 may also be positioned by directly abutting against the locating block 40, thus the coupled light distance can be ensured. In an example, the light source lamp 33 can be a light emitting diode (LED) module. In a preferred example, two locating blocks 40 are provided, and the light source lamp 33 is arranged in an area between the two locating blocks 40. In this case, a light emitted by the light source lamp 33 will not be shielded by the locating block 40, thus increasing the brightness of the backlight module.

In order to fixedly connect the locating block 40 with the heat dissipating plate 30, a fixing hole 45 is formed on the third wall 44, as shown in FIG. 2. In this case, the locating block 40 can be fixedly connected with the heat dissipating plate 30 by means of a fixing piece, such as a screw (not shown).

Although the present disclosure has been described with reference to preferred examples, various modifications can be made to the present disclosure without departing from the scope of the present disclosure and components in the present disclosure can be substituted with equivalents. Particularly, as long as there is structural conflict, all the technical features mentioned in all the embodiments may be combined together in any manner. The present disclosure is not limited to the specific examples disclosed in the description, but includes all the technical solutions falling into the scope of the claims.

The invention claimed is:

1. A backlight module, comprising a light guide plate, a glue frame, a bent heat dissipating plate, and a locating block in cooperation with the heat dissipating plate to fix the glue frame, a light source lamp facing the light guide plate being arranged on a sidewall of the heat dissipating plate at a light-incoming side of the light guide plate;

wherein the locating block forms a groove-shaped structure comprising a first wall and a second wall, and, when being assembled, the locating block is arranged on a top of the sidewall of the heat dissipating plate, on which the light source lamp is provided, and the first wall engages with the glue frame and the second wall abuts against the light guide plate, wherein
a thickness of the second wall is greater than that of the light source lamp;
the locating block further comprises a third wall extending towards the light guide plate, and when being assembled, the third wall is located between the light guide plate and a bottom plate of the heat dissipating plate;

a fixing hole is formed on the third wall to fixedly connect the third wall with the heat dissipating plate; and when being assembled, the bottom plate of the heat dissipating plate is located below the light guide plate, and projections in contact with the light guide plate are arranged on the bottom plate of the heat dissipating plate.

2. The backlight module according to claim 1, wherein an inserting port is formed on the glue frame, and the first wall inserts into the inserting port for securing the glue frame.

3. The backlight module according to claim 1, wherein two locating blocks which are arranged at an interval are provided.

4. The backlight module according to claim 3, wherein the light source lamp is arranged in an area between the two locating blocks.

5. A liquid crystal display comprising a backlight module, which comprises a light guide plate, a glue frame, a bent heat dissipating plate, and a locating block in cooperation with the heat dissipating plate to fix the glue frame, a light source lamp facing the light guide plate being arranged on a sidewall of the heat dissipating plate at s light-incoming side of the light guide plate;

wherein the locating block forms a groove-shaped structure comprising a first wall and a second wall, and, when being assembled, the locating block is arranged on a top of the sidewall of the heat dissipating plate, on which the light source lamp is provided, and the first wall engages with the glue frame and the second wall abuts against the light guide plate, wherein a thickness of the second wall is greater than that of the light source lamp;

the locating block further comprises a third wall extending towards the light guide plate, and when being assembled, the third wall is located between the light guide plate and a bottom plate of the heat dissipating plate;

a fixing hole is formed on the third wall to fixedly connect the third wall with the heat dissipating plate; and when being assembled, the bottom plate of the heat dissipating plate is located below the light guide plate, and projections in contact with the light guide plate are arranged on the bottom plate of the heat dissipating plate.

6. A liquid crystal display comprising a backlight module, which comprises a light guide plate, a glue frame, a bent heat dissipating plate, and a locating block in cooperation with the heat dissipating plate to fix the glue frame, a light source lamp facing the light guide plate being arranged on a sidewall of the heat dissipating plate at a light-incoming side of the light guide plate;

wherein the locating block forms a groove-shaped structure comprising a first wall and a second wall, and, when being assembled, the locating block is arranged on a top of the sidewall of the heat dissipating plate, on which the light source lamp is provided, and the first wall engages with the glue frame and the second wall abuts against the light guide plate;

an inserting port is formed on the glue frame, and the first wall inserts into the inserting port for securing the glue frame;

the thickness of the second wall is greater than that of the light source lamp;

the locating block further comprises a third wall extending towards the light guide plate, and when being assembled, the third wall is located between the light guide plate and a bottom plate of the heat dissipating plate;

a fixing hole is formed on the third wall to fixedly connect the third wall with the heat dissipating plate;

when being assembled, the bottom plate of the heat dissipating plate is located below the light guide plate, and projections in contact with the light guide plate are arranged on the bottom plate of the heat dissipating plate; and two locating blocks which are arranged at an interval are provided; and the light source lamp is arranged in an area between the two locating blocks.

\* \* \* \* \*